April 29, 1924.  O. MILLER  1,491,875
AUTOMATIC TAKE-UP BOLT
Filed Nov. 7. 1922
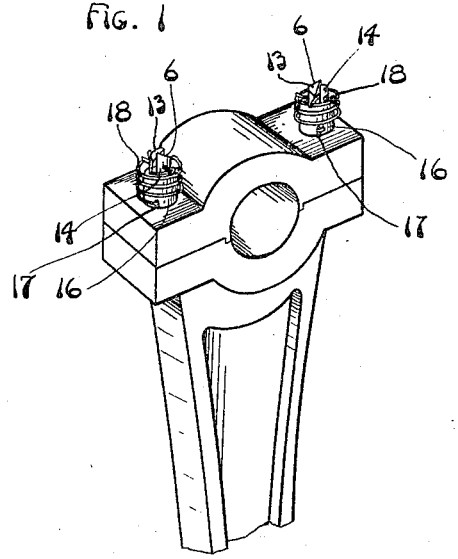
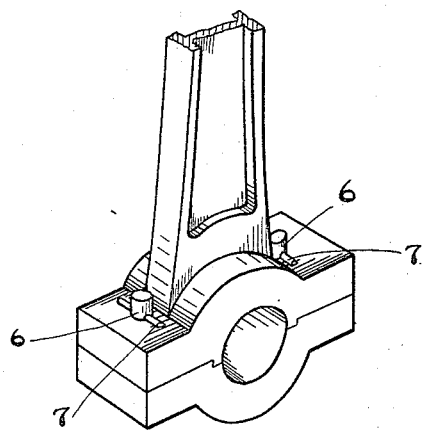
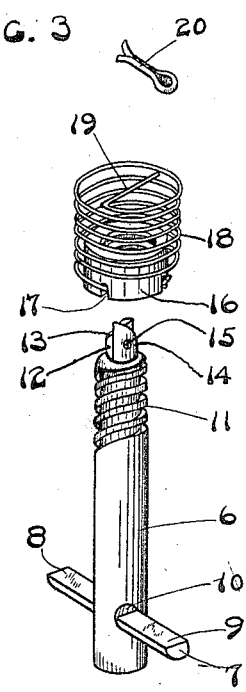
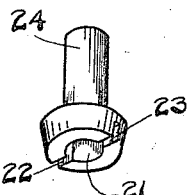
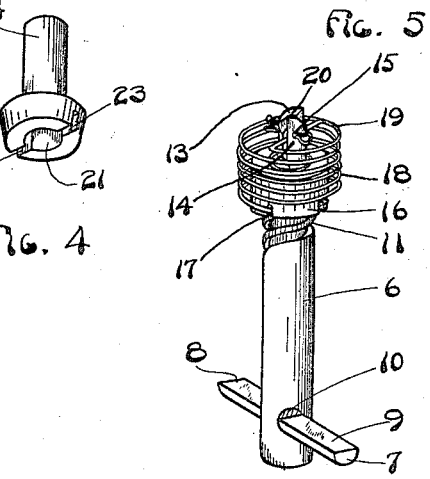
INVENTOR
Otto Miller
BY Thornton Bogert
ATTORNEY Patented Apr. 29, 1924.

1,491,875

UNITED STATES PATENT OFFICE.

OTTO MILLER, OF CINCINNATI, OHIO.

AUTOMATIC TAKE-UP BOLT.

Application filed November 7, 1922. Serial No. 599,582.

*To all whom it may concern:*

Be it known that I, OTTO MILLER, a citizen of the United States, residing at Cincinnati, in the county of Hamilton and State of Ohio, have invented a new and useful Automatic Take-Up Bolt, of which the following is a specification.

This invention relates to a bolt designed automatically to take up the wear which occurs in certain machine elements, as for example, connecting rods and the like, and has for an object to produce a bolt of this type in which a cheaper and materially simplified construction is employed to perform in a better manner the function for which bolts of this type are provided, other improved features of the bolt being incorporated for conditioning it for the proper performance of its duties.

These and other objects are embodied in the bolt construction described in the following specification and illustrated in the accompanying drawing in which:—

Fig. 1 is a fragmental perspective view of the cap end of a connecting rod equipped with bolts embodying my invention, the nut ends of the bolts being shown.

Fig. 2 is a perspective view of the same end of the connecting rod, but showing it reversed to disclose the head ends of the bolts thereof.

Fig. 3 discloses in an enlarged composite perspective view the disassociated elements of the bolt embodying my invention.

Fig. 4 is a perspective view of a tool or key which I have found convenient in placing the bolt in operative condition with relation to the elements to which it is applied.

Fig. 5 is an enlarged perspective view of the elements of the bolt assembled as they would be when in position as disclosed in Figs. 1 and 2.

Inasmuch as one of the objects of my invention has been to produce a take-up bolt which may be made cheaply and sold cheaply, I have provided that the body 6 of the bolt may be of a stock material such as cold rolled steel and the like. Instead of the usual bolt head I have provided for an improved and materially cheaper one by drilling through the body and driving therein a pin 7, which, after having been driven in, has its ends flattened slightly on the under side as indicated at 8 and 9. This is for the purpose of preventing displacement of the pin when the bolt is brought to position with the flat sides of the pin against the surface of the machine element, the shoulders 10 thus formed on the pin, occupying the bolt hole in the machine element and thus holding the pin against movement. The opposite end of the bolt is screw threaded, I having chosen to show square threads 11 although V threads may be employed if desired. At the end of the square threaded portion I have provided a cylindrical reduced shank through which a slot 12 has been provided to divide the shank into two branches 13 and 14. Through both branches I drill registering apertures 15 and above the apertures so shape the ends of the branches that they incline in opposite directions to form a pair of ratchet teeth for a purpose to be described hereinafter.

The nut 16 which is provided for the bolt is merely a short piece of stock material, such stock material as cold rolled steel or the like of round cross section but of materially larger diameter than the bolt so that its interior may be drilled and threaded for cooperation with the threads of the bolt. At the bottom of the nut a slot 17 is provided for the pinching therein of the lower end of a spiral spring 18 through the agency of which the nut is caused to move upon the bolt. The upper end 19 of the spring is bent so as to extend transversely of its diameter, in a manner such that it may occupy the slot 12, a cotter pin 20 being provided to occupy apertures 15 when the end 18 is located in the slot below the apertures.

In installing my improved take-up bolt in position on a machine element such as the connecting rod and cap shown in Figs. 1 and 2, it is but necessary to push the bolt into position until the flats 8 and 9 of its head pin 7 engage the surface of the element, the bolt passing through both members of the element. The nut 16 is then screwed upon the bolt until its surface contacts that of the element, but it is not necessary that any more than finger pressure be used in the tightening of the nut. The key shown in Fig. 4 is then brought into position with the opening 21 over the shank branches and the slots 22 and 23 on opposite sides of the opening 21 are registered with the end 19 of the spring so that when the key is pushed down over the shank the end 19 of the spring will occupy the slots. By now grasping the knurled handle 24 of the tool, and rotating it in a clockwise direction while at the same time maintaining a yielding pressure toward the nut 16, the end 19 of the spring will have a ratchet action over the inclined ends of the shank branches 13 and 14, the higher tip end of each branch operating to retain the spring against unwinding after each half revolution given it by the key. When sufficiently wound the key is removed and the end 19 of the spring is pushed down into slot 12, after which pin 20 is placed through apertures 15 to retain the spring in wound up condition. Thus through the tension placed upon the spring the nut 16 is maintained in tightened engagement with the element. As wear takes place between the portions of the machine element, tending to loosen them relatively, the tension on spring 18 causes the nut to rotate upon the threads of the bolt and to take up such looseness as fast as it occurs.

In automatic take-up bolts such as have been devised heretofore, the tensioning of the spring necessitates the use of two hands. One hand is used to wind up the spring and the other hand is used either to hold the spring against unwinding or to slip it into some spring retaining position to prevent unwinding while the other hand is again being placed in position to take another turn upon the spring. When the bolt is used in close quarters, as for example within the crank case of an automobile engine, the cramped space renders it very hard to adjust the bolt spring when two hands have to be used. In my improved bolt this objectionable feature is eliminated by reason of the ratchet-like action of the spring in cooperation with the inclined ends of the branches 13 and 14 of the shank, but one hand being necessary to adjust the spring properly and to perform all the other operations necessary to place the bolt in proper condition. Inasmuch as my improved bolt is made of all round stock material and requires merely the simplest of machining operations, it may be produced at a fraction of the cost of bolts having special head, nut and other constructions, thus making it a construction which may be placed upon the market and sold at a price materially below that of the usual automatic take-up bolt now offered for sale.

Having thus described my invention what I claim is:

1. An automatic take-up bolt comprising a threaded member having a reduced shank, a nut having screw threads for cooperation with the threaded member, and a spring on the nut, said shank having a ratchet shaped end adapted to facilitate spring tensioning and to retain the spring against release.

2. An automatic take-up bolt comprising a screw threaded member, a reduced shank on the screw threaded member having a slot therein dividing the shank into two branches, said branches having registering apertures therein, a nut, and a spring attached to the nut and having one end bent to enter the slot, the ends of said branches having opposite inclination to facilitate winding operation of the spring before entering the slot.

3. An automatic take-up bolt comprising a screw threaded member, a reduced shank on the screw threaded member having a slot therein dividing the shank into two branches, a nut, and a spring attached to the nut and having one end bent to enter the slot, the ends of said branches having opposite inclination to facilitate winding operation of the spring before entering the slot.

4. An automatic take-up bolt comprising a screw threaded member, a pin extending transversely through the bolt at one end and having the ends thereof flattened beyond the bolt, a shank at the opposite end of the member having a ratchet shaped end, a nut for cooperation with the screw threaded member, and a spring attached to the nut, adapted to cooperate with the ratchet end of the shank to permit of winding up the spring and to prevent unwinding thereof.

5. An automatic take-up bolt comprising a threaded member having a reduced shank, a nut having screw threads for cooperation with the threaded member, a spring on the nut, said shank having a ratchet shaped end adapted to facilitate spring tensioning and to retain the spring against release, and means on the shank adapted to prevent disengagement and release of the spring.

6. An automatic take-up bolt comprising a screw threaded member, a reduced shank on the screw threaded member having a slot therein dividing the shank into two branches, said branches having registering apertures therein, a nut, a spring attached to the nut and having one end bent to enter the slot, the ends of said branches having opposite inclination to facilitate winding operation of the spring before entering the slot, and means cooperating with the apertures adapted to prevent disengagement of the spring therefrom.

7. An automatic take-up bolt comprising a screw threaded member, a reduced shank on the screw threaded member having a slot therein dividing the shank into two branches, a nut, a spring attached to the nut and having one end bent to enter the slot, the ends of said branches having opposite inclination to facilitate winding operation of the spring before entering the slot, and means between the branches adapted to prevent disengagement of the spring therefrom.

8. An automatic take-up bolt comprising a screw threaded member, a pin extending transversely through the bolt at one end and having the ends thereof flattened beyond the bolt, a shank at the opposite end of the member having a ratchet shaped end, a nut for cooperation with the screw threaded member, a spring attached to the nut, adapted to cooperate with the ratchet end of the shank to permit of winding up the spring and to prevent unwinding thereof, and means on the shank adapted to prevent displacement of the spring therefrom.

9. An automatic take-up bolt comprising a threaded member having a reduced shank, a nut having screw threads for cooperation with the threaded member, a spring on the nut, said shank having a ratchet shaped end with an aperture therein, and a pin in said aperture adapted to retain the spring against release from said shank.

10. An automatic take-up bolt comprising a screw threaded member, a reduced shank on the screw threaded member having a slot therein dividing the shank into two branches, said branches having registering apertures therein, a nut, and a spring attached to the nut and having one end bent to enter the slot, the ends of said branches having opposite inclination to facilitate winding operation of the spring before entering the slot, and a pin in said apertures to prevent disengagement of the spring from the slot.

11. An automatic take-up bolt comprising a screw threaded member, a pin extending transversely through the bolt at one end and having the ends thereof flattened beyond the bolt, a shank at the opposite end of the member having a ratchet shaped end and an aperture therein, a nut for cooperation with the screw threaded member, a spring attached to the nut, adapted to cooperate with the ratchet end to permit winding up the spring, and a pin in said aperture adapted to prevent unwinding of the spring.

OTTO MILLER.